Nov. 24, 1931.  H. E. WOLF  1,833,700

PLUGGING DEVICE

Filed May 7, 1927

Inventor
Harry E Wolf
By Cornwall, Bedell & Janus
Attys.

Patented Nov. 24, 1931

1,833,700

UNITED STATES PATENT OFFICE

HARRY E. WOLF, OF WEBSTER GROVES, MISSOURI

PLUGGING DEVICE

Application filed May 7, 1927. Serial No. 189,628.

My invention relates to apparatus and method for closing off a section of a public service main such as a water or oil conduit or a gas pipe for the purpose of making extensions or repairs.

To illustrate the field of use of my invention, I shall describe briefly the present conditions surrounding the making of a repair or an extension on a city gas main at a point which is some distance from a control valve. It will be understood that the valves provided in the main when the same is laid are located at relatively long distances. In order to make a repair or extension, the workmen must visit each of the number of houses which are supplied by the main beyond the valve or between the valves which are to be closed, and notify the occupants that the gas supply is to be shut off. The valve is then closed, and the necessary repair made in the main, the gas in the main escaping and filling the surrounding atmosphere with noxious odors. After the repair or extension is completed, it is necessary for the workmen to again visit the same houses and notify the occupants that the gas is to be turned on. After the gas is turned on, a third visit is made to the same houses to be sure that no outlets in any house have been left open and that gas is escaping therethrough.

The object of my invention is to provide an efficient device whereby the above disadvantages may be eliminated.

In the accompanying drawings which illustrate my invention—

Figure 2:
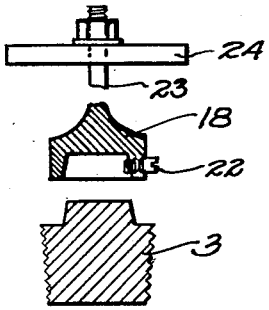
Figure 2 is a detail of a plug and plug manipulating member which is used in connection with the apparatus shown in Figure 1.

In the drawings, the ordinary piping of the main is indicated at 1. Preferably at the time that the main is laid, suitable T's 2 are provided at intervals according to the likely requirements for extensions. Each of these T's will have its side branch 4 threaded interiorly to receive a plug 3 whereby this branch is closed. This branch is also threaded exteriorly to accommodate a valve body 5 screwed thereon. In the drawings I illustrate a valve body provided with a gate valve 6 which may be opened and closed by its handle 7 in the usual manner.

Detachably mounted upon valve body 5 is an elongated chamber 8, the lower end of which opens into the interior of the valve body. A hollow sleeve 9 extends lengthwise through chamber 8 and is shown as having threaded engagement with the latter at 10. The outer end of chamber 8 is provided with a stuffing box 11 surrounding sleeve 9 and sealing the interior of the chamber from the atmosphere. The outer end of sleeve 9 is provided with a handle 12 by which it may be rotated to positively move it inwardly or outwardly in chamber 8.

A stem 13 is enclosed in sleeve 9 and may slide up and down therein. A stuffing box 14 mounted on the outer end of sleeve 9 encloses stem 13 and seals the interior of the sleeve from the atmosphere. The outer end of stem 13 is provided with a handle 15 whereby the stem may be moved in and out in its sleeve or rotated if desired.

On the inner end of stem 13 I mount a compressible solid stopper element 16, preferably formed of a solid block of rubber and adapted to be positioned in chamber 8 beyond valve 6 and to be moved from such position through the valve and the T branch 4 into the body of the main where it will be seated against the wall of the main opposite to the branch and the other apparatus described. A metallic washer 17 on the outer face of stopper 16 forms a seat for the inner end of sleeve 9 and it will be obvious that when handle 12 is rotated to force sleeve 9 inwardly, the latter will engage the outer face of stopper 16 and pressing on the latter in one direction, compress the adjacent portion and expand the stopper in other directions so that it is forced against the inner walls of the main and completely seals the latter.

Operation: Assuming the main to be provided with the T 2, the branch of which is closed by a plug 3, and it is desired to close off the main so that an extension may be provided or repairs may be made at either side of the T: The plug will be loosened slightly and the socket wrench 18 applied to the squared portion of the plug and attached thereto by means of the set screw 22. The valve body 5 with the valve open will then be slipped over the stem 23 of the wrench and screwed onto the T branch. If desired, the chamber 8 may then be applied over the wrench stem and the interior of the valve and chamber closed to the atmosphere with the stuffing box 11. The wrench handle 24 is then applied and the wrench rotated so that the plug may be removed from the T and the valve body, whereon the valve is closed.

Thereupon the chamber 8, plug, and wrench may be removed from the valve body and disassembled. (It will be understood that if desired the plug may be removed through the valve and the valve quickly closed without necessarily applying the chamber 8 although this will result in some escape of gas.) A stopper 16 with its stem 13 and the corresponding sleeve 9 may be assembled with the chamber and applied to the valve body. Valve 6 is then opened and stem 13 readily forced inwardly by manual pressure to substantially close the opening in the main. Sleeve 9 is then screwed inwardly to engage the outer end of stopper 16 and compress the latter as previously described and seal the main.

If the section of main illustrated is a dead-end section, the same may be opened up at any point beyond the seal and repairs or extensions made. If the main is a continuous one without an adjacent dead-end, it will be necessary to duplicate the apparatus and operations described above at a point on the other side of where the extension or repairs are to be made.

After the repairs are completed, the stopper is removed from the main and the valve body and the valve closed. Chamber 8, the stopper and its stem are then removed from the valve body and the plug and its wrench substituted for the stopper and its stem. (Sleeve 9 may be used with the wrench stem or not, as desired.) The elongated chamber is then replaced, the valve opened, and the plug moved into position where its threads will engage the T branch and the plug may be tightened sufficiently to prevent any substantial escape of gas. The valve is then removed and the plug tightened with an ordinary wrench applied directly thereto. While the stopper is applied to the main and after the plug has been reapplied, it may be desirable at any time to know what is the pressure in the chamber 8 so as to determine whether the stopper or plug is functioning. To meet this requirement I provide a gauge 25 and a relief cock 26 in the side of chamber 8. The gauge will indicate the pressure in the chamber and by means of the relief cock this pressure may be released and the cock closed to determine the time required to build up the pressure in the chamber whereby the rate at which the gas is escaping may be determined.

Figure 1:
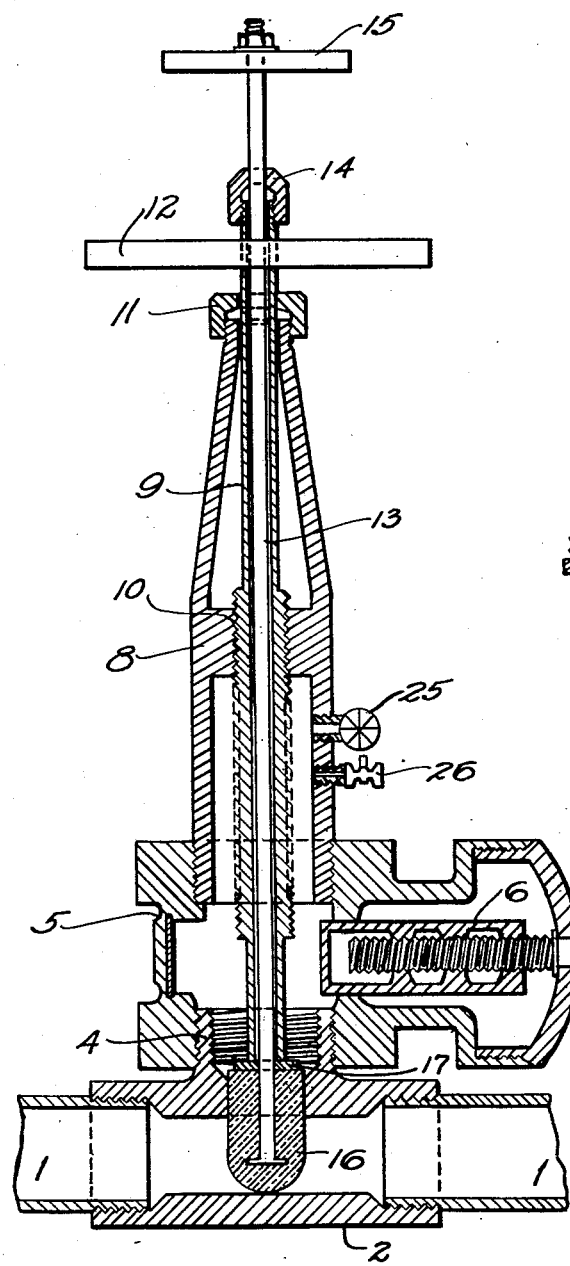
Figure 1 is a section taken longitudinally through a portion of the main and having my invention applied thereto.

In order to adapt my invention for use on mains which were not originally equipped with T's for the application of the valve body, I provide a saddle member 19 (Figure 3) which is adapted to be clamped to the main 20 by one or more U-bolts 21 and is adapted to mount a valve body such as shown in Figure 1. A drilling apparatus may be mounted on the valve body and a hole drilled through the exposed portion of the main, the drill withdrawn, the valve closed, the drilling apparatus removed, and a chamber, sleeve, and stopper assembly applied to the saddle. The saddle and drilling arrangement is not new and I merely refer to the same as illustrating the use of my improved apparatus in connection with a main which does not have an outlet corresponding to the side branch of the T shown in Figure 1.

Figure 3:
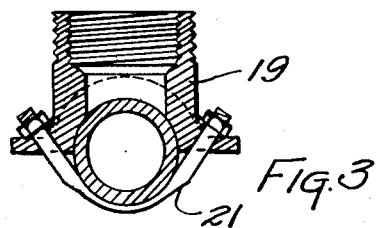
Figure 3 is a section through a detail of the apparatus adapted to be applied to the main but embodying a modification of the corresponding detail of the structure shown in Figure 1. The section of this figure is taken at right angles to the section of Figure 1.
Figure 4:
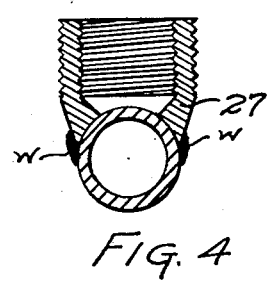
Figure 4 is a similar section of a corresponding portion of another modification of my invention.

Another saddle structure is indicated in Figure 4 in which the member 27 is welded onto the main instead of being attached thereto by clamps as indicated in the device shown in Figure 3. The saddle or nipple 27 is adapted to mount the valve body and a drill may be inserted through the valve and nipple to make an opening in the main.

Each of the devices shown in Figures 3 and 4 are threaded to receive a plug 3 similar to the interior threading of the branch on T 2.

It will be understood that a valve with a rotatable plug may be substituted for the gate valve illustrated, and that various other modifications in the details of my invention may be made without departing from the spirit thereof. I contemplate the exclusive use of all such variations as come within the scope of my claims.

I claim:

1. In a sealing device for a main, a chamber one side of which is adapted to be removably attached to the main and communicating with the interior thereof, a compressible block-like stopper movable through said chamber from one side to the other side thereof and through the latter so as to be seated against an opposing wall of the main, a stem on said stopper projecting outwardly of the chamber, a sleeve surrounding said stem and projecting outwardly of said chamber and threaded into said chamber and engaging said stopper and adapted to be rotated in said chamber to force said stopper against its seat to distort the body of said stopper so as to press the latter against the main wherever it contacts therewith, a stuffing box on said sleeve for said stem, and a stuffing box on said chamber for said sleeve.

2. In a sealing device for a main, a member providing a lateral outlet from the main, a valve body mounted on said member for closing said outlet, a block-like stopper movable through said valve body and outlet into said main, and means detachably mounted on said valve body for cooperating therewith to force said stopper against the opposing inner walls of said main by applying pressure in one direction to one face of the stopper to expand the latter in other directions.

3. In a sealing apparatus for a main, a member providing an outlet from the main, a valve body on said member, a valve therein, an enclosed chamber connected to the interior of said body on the side of said body opposite to said outlet, a cylindrical stopper in said chamber and freely movable through said body, when the valve is opened, into the main, and means operable from the exterior of said chamber for moving said stopper as described, said stopper comprising a solid block of rubber or like material 4. In a sealing apparatus for a main, a member providing an outlet from the main, a valve body on said member, a valve therein, an enclosed chamber connected at its inner end to the interior of said body on the side of said body opposite to said outlet, a solid stopper in said chamber and movable through said body, when the valve is opened, into the main, a sleeve with its inner end engaging said stopper and with its outer portion extending out of said chamber, a stuffing box on the outer end of said chamber surrounding said sleeve, a handle on the outer end of said sleeve for manipulating the same to apply pressure to the exterior of said stopper in one direction to expand the stopper in other directions, and means operable from the exterior of said chamber for moving said stopper as described.

5. In a sealing apparatus for a main, a member providing an outlet from the main, a valve body on said member, a valve therein, an enclosed chamber connected at its inner end to the interior of said body on the side of said body opposite to said outlet, a solid stopper in said chamber and movable through said body, when the valve is opened, into the main, a sleeve with its inner end engaging said stopper and with its outer portion extending out of said chamber, a stuffing box on the outer end of said chamber surrounding said sleeve, a handle on the outer end of said sleeve for manipulating the same to apply pressure to the exterior of said stopper in one direction to expand the stopper in other directions, means operable from the exterior of said chamber for moving said stopper as described, a stem in said sleeve and connected to said stopper and projecting outwardly from said sleeve, a stuffing box on said sleeve surrounding said stem, and a handle on said stem for moving said stopper when the latter is not engaged by said sleeve.

6. In a sealing device for a main, a chamber one side of which is adapted to be removably attached to the main and having an opening for communicating with the interior thereof, a stopper adapted to be passed through said opening into the main, said stopper comprising a substantially solid block of compressible material, and means for applying pressure to the outer face of said stopper whereby said pressure will be distributed to all points of engagement between said stopper and the wall of the main.

7. In a sealing device for a main, a chamber one side of which is adapted to be removably attached to the main and having an opening for communicating with the interior thereof, a stopper adapted to be passed through said opening into the main, said stopper comprising a substantially solid block of compressible material, means for selectively moving said stopper into or out of said main and means for applying pressure to the outer face of said stopper whereby said pressure will be distributed to all points of engagement between said stopper and the wall of the main.

8. In a sealing device for a main, a chamber one side of which is adapted to be removably attached to the wall of the main and has an opening which may communicate with the interior of the main, a stopper comprising a solid block of compressible material which may be passed through said opening into the main and substantially fill the opening and the adjacent section of the main, and a member threaded into said chamber and engaging the upper face of said stopper for applying pressure to the latter which may be distributed to all points on the stopper which contact with the wall of the main.

9. In a sealing device for a main, a chamber one side of which is adapted to be removably attached to the wall of the main and has an opening which may communicate with the interior of the main, a stopper comprising a solid block of compressible material which may be passed through said opening into the main and substantially fill the opening and the adjacent section of the main, a member detachably mounted upon an upper portion of said chamber and extending outwardly therefrom, a sleeve threaded into said member and extending into said chamber and engaging the upper face of said stopper, and means exterior of said member for rotating said sleeve so as to apply pressure to the outer portion of said stopper and expand the portion of said stopper which is within the main.

10. In a sealing device for a main, a body having one side open and applicable to the main and adapted to communicate therewith and having an opening in the opposite side, a chamber detachably mounted on said opposite side and communicating with the interior of said body, a stopper comprising a substantially solid block of compressible material which may be housed in said chamber and may be moved from said chamber through said body into the main, and means mounted on said chamber and movable through the same and said body to engage the face of said stopper to apply pressure to the same and to distort said stopper by compressing it in one direction and expanding it in other directions to tightly engage the walls of the main and the edge of the opening with the same.

11. An apparatus for temporarily stopping a fluid pipe, having an opening formed through the side wall thereof, comprising a member secured to said pipe and having a cylindrical portion extended outwardly therefrom, and in alinement with the opening through the wall of said pipe, a plug of resilient material adapted to be introduced through said cylindrical portion and through said opening in the wall of the pipe into the interior of said pipe, said plug being of a shape which differs substantially from the cross-sectional shape of said pipe, and means whereby said plug is pressed forcibly against the portion of the wall of said pipe opposite to said opening to cause said plug to be distorted to approximately the cross-sectional shape of the pipe, whereby passage of fluid through said pipe is interrupted.

12. An apparatus for temporarily stopping a fluid pipe having an opening formed transversely through the side wall thereof, comprising a member secured to said pipe, said member including a portion conforming to the shape of the pipe and having a cylindrical portion extended outwardly therefrom in alinement with said opening in the wall of the pipe, means whereby said member may be secured to said pipe, a plug formed of resilient material adapted to be introduced through said cylindrical portion and through said opening in the wall of the pipe into the interior of said pipe, means whereby said plug is pressed forcibly against the portion of the wall of the pipe opposite to said opening to cause said plug to be distorted to approximately the cross-sectional shape of the pipe, whereby passage of fluid through said pipe is interrupted, and a plug for sealing said cylindrical portion after said stopper has been withdrawn therefrom.

In testimony whereof I hereunto affix my signature this 3rd day of May, 1927.

HARRY E. WOLF.